United States Patent [19]

Paulsen

[11] Patent Number: 5,222,581
[45] Date of Patent: Jun. 29, 1993

[54] AUTOMATIC SELECTOR DEVICE FOR A MOTOR VEHICLE CHANGE-SPEED GEARBOX

[75] Inventor: Lutz Paulsen, Esslingen, Fed. Rep. of Germany

[73] Assignee: Mercedes-Benz AG, Fed. Rep. of Germany

[21] Appl. No.: 914,536

[22] Filed: Jul. 17, 1992

[30] Foreign Application Priority Data

Jul. 23, 1991 [DE] Fed. Rep. of Germany ....... 4124385

[51] Int. Cl.⁵ .............................................. F16H 61/28
[52] U.S. Cl. ..................................... 192/3.58; 74/335; 74/866
[58] Field of Search ................... 74/335, 866; 192/3.58

[56] References Cited

U.S. PATENT DOCUMENTS

| | | | |
|---|---|---|---|
| 3,937,108 | 2/1976 | Will | 74/866 |
| 4,345,489 | 8/1982 | Müller et al. | 74/866 X |
| 4,981,052 | 1/1991 | Gierer | 74/866 |

*Primary Examiner*—Richard M. Lorence
*Attorney, Agent, or Firm*—Evenson, McKeown, Edwards & Lenahan

[57] ABSTRACT

In an automatic selector device for a change-speed gearbox of a motor vehicle, a frictional connection, i.e. a clutch or brake, which can be engaged and disengaged by a gear retention control valve is held in the instantaneous position on the occurrence of a fault in an electronic control unit for the gear change.

20 Claims, 2 Drawing Sheets

AUTOMATIC SELECTOR DEVICE FOR A MOTOR VEHICLE CHANGE-SPEED GEARBOX

CROSS-REFERENCE TO RELATED APPLICATIONS

This application is related to U.S. patent application Ser. No. 07/908,255 filed on Jul. 6, 1992 in the name of Lutz Paulsen, et al. for AUTOMATIC SELECTOR OF A MOTOR VEHICLE EPICYCLIC CHANGE-SPEED GEARBOX and U.S. patent application Ser. No. 07/917,171 filed on Jul. 23, 1992 in the name of Alfons Müller for AUTOMATIC SELECTOR DEVICE OF A CHANGE-SPEED GEARBOX OF A MOTOR VEHICLE.

BACKGROUND AND SUMMARY OF THE INVENTION

The present invention relates to a selector device, and more particularly, to an automatic selector device of a change-speed gearbox of a motor vehicle, in which a frictional connection, i.e. a clutch or brake, can be engaged by a selector setting element which is connected to a selector valve by a working pressure conduit and in which the one electromagnetic control valve which can be triggered by an electronic control unit is connected to the selector valve by a control pressure conduit.

In a known selector device shown in ATZ 88 (1986), No. 12, Page 681, an electronic part and a hydraulic part are divided such that the hydraulics are responsible, inter alia, for subjecting the respectively actuated selector setting element to pressure, and the electronics controls the gear change and also, to some extent, the level of the hydraulic pressure.

The connection between the electronics and the hydraulics is generally effected by electromagnetic 3/2-way valves configured such that when they are excited, i.e. when an electric current flows through their coils, the associated selector setting element is subjected to hydraulic pressure.

Interruption of the flow of current to the solenoid valves, whether due to a defect in the electronic control or failure of the voltage supply, leads to an interruption of the force path and to dangerous driving situations either because, in overrun, the engine brake (and possibly a retarder located in front of the gearbox) are rendered ineffective or, when the engine is providing traction, the engine torque is no longer available on a gradient.

In order to avoid the above-mentioned problem, so-called locking solenoid valves can, for example, be used. These valves are equipped with a permanent magnet which ensures that in the absence of a current supply, the solenoid valve remains in a position once it has been reached. Switching over into the respective other position takes place by way of a short selector pulse whose sign defines the position selected.

A disadvantage of the locking solenoid valve solution, apart from the complicated design of the solenoid valve and the triggering necessary using a reversible current direction, is that the valve position selected is not unambiguously defined when there is no current flowing through the coil. Thus, it can happen, for example, that a valve previously located in the activated position could move unintentionally into the deactivated position due to vibration, external magnetic fields, etc. This would again deprive the respective selector setting element of pressure.

Even more serious in such a solution is the problem of defined switch-off. If the electrical connection to a solenoid valve should be interrupted, the valve and, therefore, the associated selector setting element can no longer be switched off so that, for example, it would be more difficult to tow the vehicle or the gearbox could even be jammed if a different frictional connection (clutch or brake) were switched on.

An object on which the present invention is based consists essentially in providing an automatic selector device in which the above-described problems are avoided. This object has been achieved in an advantageous manner in accordance with the present invention by locating an electromagnetic gear retention control valve which can be triggered by the control unit and which is connected to the working pressure conduit in the control pressure conduit. The gear retention control valve is connected both to the selector valve and to the control valve, such that, on the occurrence of a fault signal at an output of the control unit, it can be driven from a gear release position, in which the control pressure conduit is open and the working pressure conduit is shut off from the control pressure conduit, into a gear retention position, in which the control pressure conduit is shut off and the section of the control pressure conduit connected to the selector valve is connected to the working pressure conduit.

In the selector device according to the present invention, the gear retention control valve which is switchable between a gear release position and a gear retention position can be moved into one of those positions by spring force and into its other position by an electromagnet.

In the case of a plurality of selector setting elements, such a gear retention control valve can only be associated with one selector setting element, with the number of selector setting elements then being equal to the number of gear retention control valves. Alternatively, a common gear retention control valve can be used for a plurality of or all the selector setting elements.

The present invention can be utilized with those selector devices in which a common pressure control valve controls the working pressure for a plurality of selector setting elements and an electromagnetic 3/2-way control valve is respectively used both for the selector valve and for the control valve.

The present invention can also be used in a corresponding manner to those selector devices in which the working pressure for each selector setting element is separately controlled. For this purpose, a pressure control valve is respectively used both for the selector valve and for the control valve.

In all applications where the present invention is utilized, the gear retention control valve is switched over first in the case of a failure of the electronics so that the section of the control pressure conduit connected to the selector valve is connected to the working pressure conduit of the relevant selector setting element. If, on one hand, the control pressure conduit and therefore, the working pressure conduit were previously unpressurized, the selector setting element also remains deactivated. If, on the other hand, the working pressure of the selector setting element is above a certain pressure level, the selector valve is held in its correspondingly open position by the working pressure, and the selector setting element therefore remains activated.

In one presently contemplated embodiment of the invention, the gear retention control valve is moved into its gear retention position by spring force.

Rapid switching of the gear retention control valve when the exciter current is switched off is achieved by auxiliary pressure to support the spring force. When the vehicle is started, the gear retention control valve is excited before the engine is running, and the main pressure conduit is therefore still unpressurized. The selector magnet therefore only has to overcome the spring force. The selector magnet can now be configured such that it requires substantially less electrical energy for retention than it does for selection. In other words, for constant electrical excitation, the magnet can exert a substantially greater force in the activated condition. When the engine is running and the gear retention control valve is activated, it is possible to permit a pressure, whose level is limited by a pressure limiting valve, to act on the gear retention control valve, as a supplement to the spring force so that the switching period is, of course, reduced when the excitation current is switched off.

The present invention further provides the advantage that, in the case of a defective gear retention control valve, the normal function of the control is not prevented because the gear release position is selected by spring force. In that case, the electronic control unit automatically activates a separate current path in the case of a defect or in the case of a failure of its voltage supply, and the gear retention control valve is excited by this separate current path. Until the gear retention control valve has switched over into its gear retention position, the electromagnetic control valve continues to be supplied with current for a limited period of time by way of a delay element.

BRIEF DESCRIPTION OF THE DRAWINGS

These and other objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
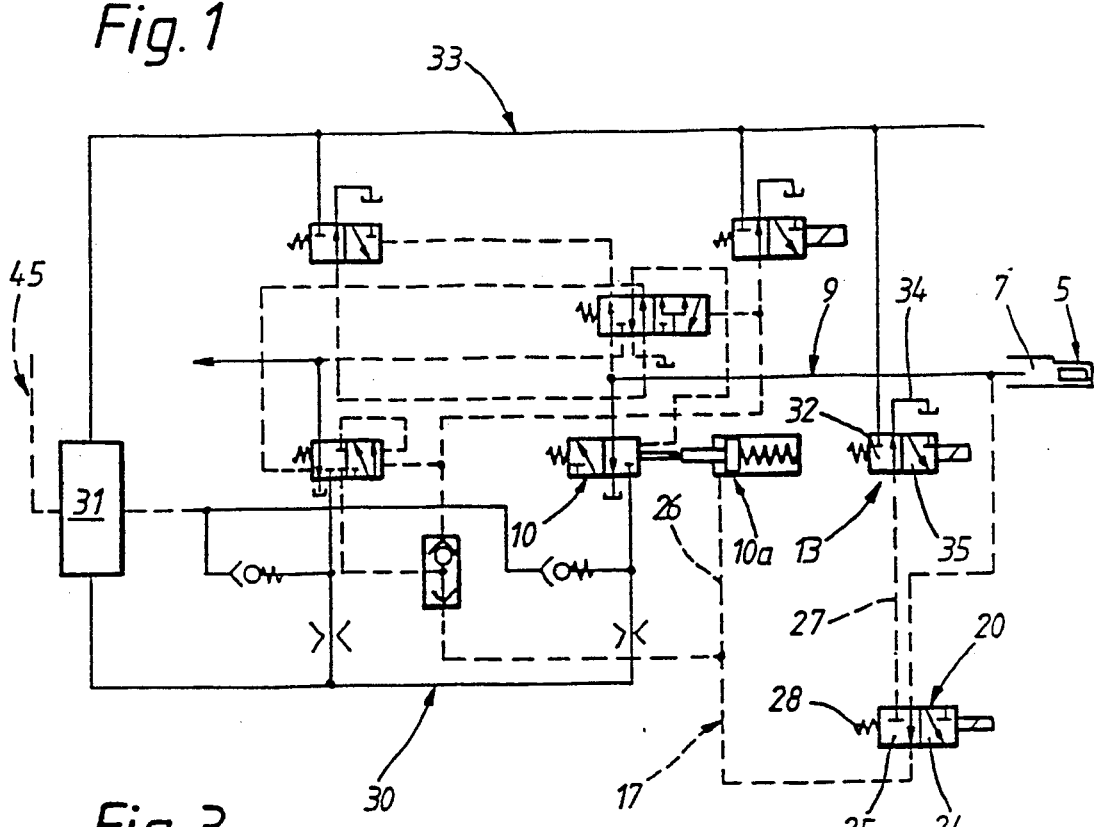
FIG. 1 is a circuit diagram of a portion of an automatic selector device according to the present invention.

Referring to FIG. 1, a selector setting element 7 of the axial piston type is connected to an epicyclic change-speed gearbox (not shown in detail) by a working pressure conduit 9 with a 3/2-way selector valve 10 in order to actuate a known type of frictional gear brake 5. A 3/2-way selector valve 10 is also connected to a controller pressure conduit 30 and to a pressure-relieved return. The valve 10 can be moved by spring force into its gear position in which the working pressure conduit 9 is connected to the controller pressure conduit 30 and the return is shut off. The selector valve 10 is moved into its deactivated position by a setting element 10a connected to a control pressure conduit 17. In the deactivated position, the working pressure conduit 9 is shut off from the controller pressure conduit 30 and is connected to the return. In this particular embodiment, the setting element 10a is ineffective when the control pressure conduit 17 is under pressure, whereas one or more springs of this setting element 10a switch over the selector valve 10 when the control pressure conduit 17 is relieved.

The controller pressure conduit 30 starts from the outlet of a pressure control device 31 which is supplied from the high pressure of a high pressure conduit 33 and operates as a function of a load-dependent modulation pressure of a modulation pressure conduit 45.

The controller pressure conduit 17 leads to an electromagnetic 3/2-way control valve 13 which is connected to the main pressure conduit 33 and to a return 34. In its zero-position 32 selected by spring force, the valve 13 shuts off the control pressure conduit 17 from the main pressure conduit 33 and connects it to the pressure-relieved return 34. On excitation, control valve 13 switches over into its gear position 35 in which the control pressure conduit 17 is connected to the main pressure conduit 33 and is shut off from the return 34.

An electromagnetic 3/2-way gear retention control valve 20 is inserted in the control pressure conduit 17 and connected to the working pressure conduit 9. In its gear release position 24 selected by excitation of its electromagnets, the control valve 20 opens the control pressure conduit 17 and shuts that conduit off from the working pressure conduit 9. The gear retention control valve 20 is switched over by spring force 28 into its gear retention position 25 in which the section 27 of the control pressure conduit 17 connected to the control valve 13 is shut off and the section 26 of the control pressure conduit 17 connected to the selector valve 10 (or to the associated selector element 10a) is connected to the working pressure conduit 9.

Thus, in the case of a defect or a failure of voltage in the electronic control unit triggering the electromagnetic valves 13 and 20, the gear retention control valve 20 is brought into its gear retention position 25. Thereby, the setting element 10a of the selector valve 10 is connected to the working pressure conduit 9. If the working pressure conduit 9 is unpressurized on the occurrence of the defect (the selector valve 10, therefore, being in its deactivated position selected by depressurization of the control pressure conduit 17), this position is then maintained, and the selector setting element 7 remains unpressurized and the gear brake 5 disengaged. If, however, the selector setting element 7 is subjected to working pressure on the occurrence of the defect and the selector valve 10 is, as a result, in its gear position, this position will then be retained because its setting element 10a is subjected to working pressure via the gear retention control valve 20. The gear brake 5 therefore remains engaged.

Figure 2:
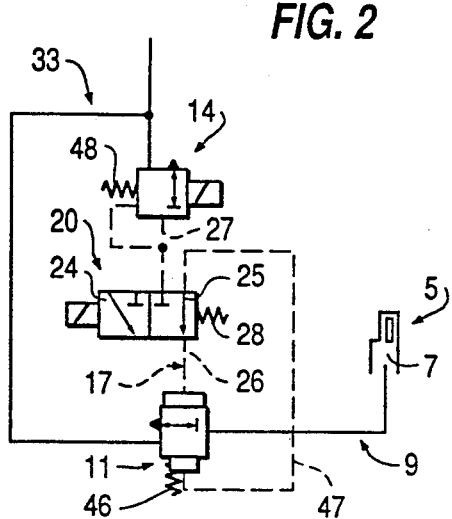
FIG. 2 is a circuit diagram similar to FIG. 1 but showing a selector device in which a pressure control valve is used to control and operate a selector setting element.

The embodiment of FIG. 2 (where parts similar in structure and operation to the embodiment of FIG. 1 are designated by the same reference numerals in FIG. 2) differs from the selector device of FIG. 1 in that, instead of a common pressure control device 31 of FIG. 1 (for a plurality of selector valves), one pressure control valve is used for each selector valve 11 and the associated control valve 14. Consequently, the selector setting element 7 of the frictional gear brake 5 is connected by a working pressure conduit 9 to the control output of the selector valve 11 fed from the main pressure conduit 33 and having pilot control via the control pressure conduit 17. The respective position of the selector valve is determined by the force equilibrium at the control piston on which the control pressure force of the control pressure conduit 17 is effective in one direction, and a spring force 46 and a control pressure force (control pressure conduit 47) derived from the working pressure of the working pressure conduit 9 is effective in the opposite direction.

The control pressure conduit 17 in the embodiment of FIG. 2 leads to the controller output of the control valve 14 whose position is determined by the force equilibrium on its control piston on which the force of the electromagnet acts in one direction and a spring force 48 and a control pressure force derived from the controller outlet pressure (section 27 of the control pressure conduit 17) acts in the opposite direction.

An electromagnetic 3/2-way gear retention control valve 20 is inserted in the control pressure conduit 17, which valve 20, in its gear release position 24 selected by the electromagnet, opens the control pressure conduit 17 and shuts it off from the working pressure conduit 9. In its gear retention position 25 selected by spring force 28, the control valve 20 connects the section 26 of the control pressure conduit 17, which is connected to the selector valve 11, to the working pressure conduit 9 and shuts off the section 27 of the control pressure conduit 17 connected to the control valve 14. In the case of a defect in the associated electronic control unit for the valves 14 and 20, therefore, the control input 26 of the selector valve is connected to the selector setting element 7 so that its pressure condition, and therefore selection condition, is maintained.

Figure 3:
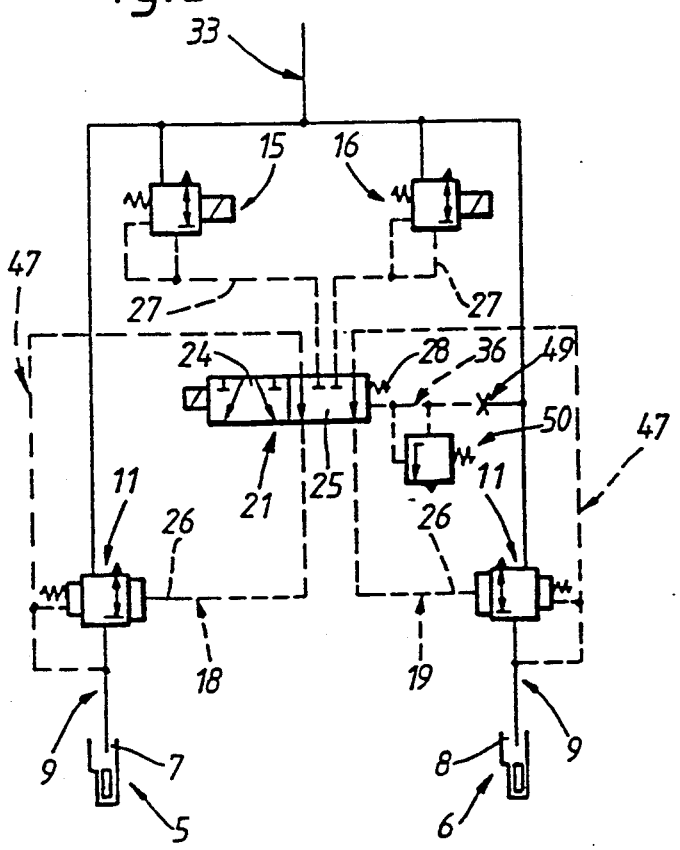
FIG. 3 is a circuit diagram similar to FIG. 2 but showing a selector device in which a common gear retention control valve is associated with two selector setting elements.

In the selector device embodiment of FIG. 3, two frictional gear brakes 5, 6 can be engaged by selector setting elements 7, 8, respectively, which are each connected by a working pressure conduit 9 to a pressure control valve used as a selector valve. The two selector valves 11 are connected by respective control pressure conduits 18, 19 to associated pressure control valves, which can be influenced electromagnetically and are used as the control valves 15, 16. The selector valves 11 and the control valves 15, 16 operate in the same manner as the selector valve and the control valve 14 of the selector device of FIG. 2 and are, therefore, also supplied from the main pressure conduit 33. A common electromagnetic 6/2-way gear retention control valve 21 is provided in the control pressure conduits 18 and 19, to which control valve 21 the control pressure conduits 47 used as the return from the associated selector setting elements to the selector valves are also connected. In the gear release position 24 selected by the electromagnet, the pressure control conduits 18, 19 emerging from the control valves 15, 16 are open, and they are shut off from the respective control pressure conduit 47 used for the return. In the gear retention position 25 selected by a spring force 28 and a control pressure force of an auxiliary control pressure conduit 36 effectively acting in the same direction, the sections 26 of the control pressure conduits 18, 19 associated with the respective selector valves 11 are connected to the associated control pressure conduits 47 used for return and, thereby, to the associated working pressure conduits 9, whereas the sections 27 of the control pressure conduits 18, 19 connected to the control valves 15, 16 are shut off. In this manner, when a defect occurs in the control electronics, the selection condition of the selector setting elements 7 and 8 is also retained in this selector device. The auxiliary control pressure conduit 36 branches off, via a throttle 49, from the main pressure conduit 33 and is connected to a pressure limiting valve 50 which keeps the pressure in the conduit 36 lower than that in the conduit 33.

Figure 4:
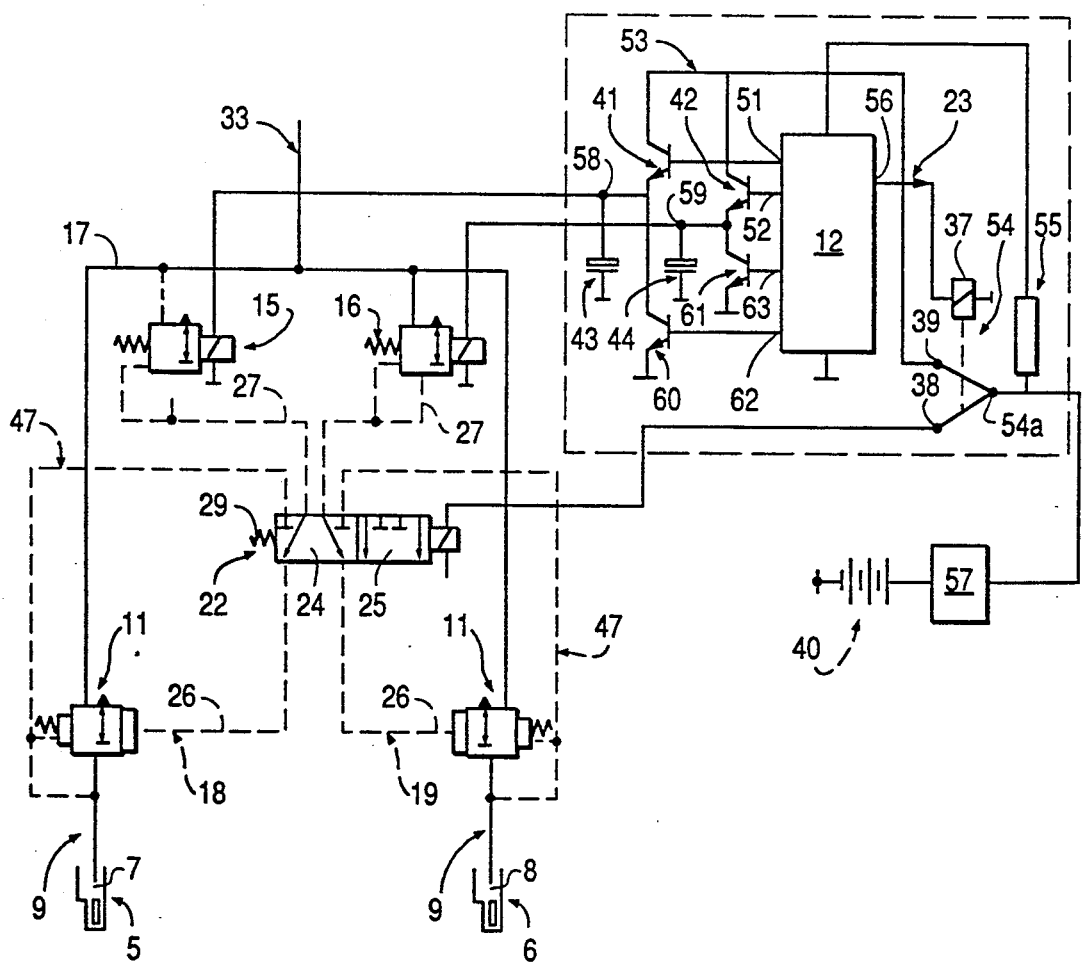
FIG. 4 is a circuit diagram similar to FIG. 3 but showing a selector device in which the gear retention control valve is moved into its gear release position by spring force.

Compared with the device of FIG. 3, the embodiment of selector device shown in FIG. 4 differs in that the electromagnetic 6/2-way gear retention control valve 22 common to the two selector setting elements 7, 8 can be moved by spring force 29 into the gear release position 24 and can be activated into the gear retention position 25 by the electromagnet. As far as the other hydraulic control and selector components are concerned, the selector device of FIG. 4 is similar to the selector device of FIG. 3 so that the same reference numbers and associated description of FIG. 3 can be used for understanding FIG. 4.

The selector device of FIG. 4 is, however, triggered by the electronic control unit 12 in a different way because of the different functioning of the electromagnet of the gear retention control valve 22. In particular, the control valves 15, 16 are connected in parallel with one respective capacitor 43, 44 at one respective electronic final stage 41, 42. The power supply to the final stages 41, 42 takes place, via a conductor 53 and a selector relay 54, from a current source 40 which can, for example, be a conventional vehicle battery. The final stages 41, 42 are each triggered by one respective outlet 51, 52 of the control unit 12.

The electromagnetic setting element 37 of the selector relay 54 is triggered by a further outlet 56 of the control unit 12 whose current supply takes place, via a resistance 55, again from the current source 40. In its non-excited position 38, the selector relay 54 connects its selector contact 54a, which is connected to the current source 40, to a selector contact connected to the gear retention control valve 22 and, in its excited position 39, to a selector contact connected to the conductor 53 of the final stages 41, 42.

When the ignition equipment 57 is switched on, the connected selector contact 54a of the selector relay 54 is supplied with battery voltage as is the control unit 12 (via the resistance 55), which then excites the electromagnet 37 via its output 56 so that the selector relay 54 is brought into its position 39 in which the final stages 41, 42 are also supplied with battery voltage. The control valves 15, 16 and, therefore, the capacitors 43 and 44, remain without current, however, as long as the bases of the final stages 41, 42 are not triggered by the control unit 12. The engine, once started, also makes the high pressure available in the high pressure conduit 33.

When the control unit 12 triggers the base of the final stage 41, e.g. via its output 51, the pilot control valve 15 is subjected to a certain voltage and the capacitor 43 is simultaneously charged with the same voltage. The control valve 15 regulates the control pressure in the control pressure conduit 17 to a pressure corresponding to the voltage. This control pressure influences the selector valve 11 of the selector setting element 7 in a known manner. If a defect now appears in the control unit 12 or if a defect occurring in the final stages 41, 42, for example, is recognized thereby, the voltage at the output 56 is switched off immediately and the electromagnetic setting element 37 of the selector relay 54 is then without current. This moves the selector relay 54 into its position 38, and the gear retention control valve 22 is moved into its gear retention position 25.

The time required to switch over the gear retention control valve 22 is bridged over because the capacitor 43 discharges. Its discharge current flows through the excitation coil of the control valve 15 and thereby maintains its excitation for a further short period.

In order that the respective control valve 15 or 16 does not have its excitation subjected to the voltage of the connected capacitor 43 or 44 through the control unit 12 via its output 51 or 52 (and therefore switches off with a delay during every "normal" switch-off), the following arrangement is adopted:

Each of the two capacitors 43 and 44 is connected to ground by a discharge selector element 60 or 61 which can be controlled by the control unit 12 via an output 62 or 63. These selector elements 60, 61 are in the shut-off condition when the control valves 15, 16 are excited by the control unit 12 normally, i.e. via the outputs 51, 52, so that the connected capacitors 43, 44 are charged synchronously with the excitation. The selector elements 60, 61 are brought into the open condition by the outputs 62, 63 of the control unit 12 when the outputs 51, 52 are without current, i.e. when the excitation of the control valves 15, 16 is switched off, so that the capacitors 43, 44 can discharge to ground. In any event, the selector elements 60, 61 are brought into the shut-off condition when the fault signal 23 appears, i.e. when the voltage at the output 56 of the control unit 12 becomes zero. The electrical supply 53 of the final stages 41, 42 through the selector relay 54 is then switched off.

If one or both control valves 15, 16 has been excited at this time, this excitation will be maintained for a limited period because of the discharge of the associated capacitor 43, 44, inasmuch as the discharge selector element 60, 61 is in the shut-off condition, in order to ensure that the selection condition of the selector setting element 7, 8 is maintained during the switching period of the gear retention control valve 22.

Because of the respective connection 58 or 59 of the capacitor 43, 44 used as the delay element to the respective final stage 41, 42, the condition of the control valves 15, 16 is, as it were, recognized for the control, and a switch-off delay is only initiated when it is sensible, i.e. in the excited condition of the selector valves 15, 16.

If none of the control valves 15, 16 were excited at the time when the fault signal 23 appeared, there is again no effect due to the delay elements because no charging has occurred.

As is apparent from the foregoing description with regard to FIGS. 3 and 4, a common gear retention control device 21 and 22, respectively, is provided for a number n of frictional connections each having an associated selector setting element 7 and 8, respectively, with a 3 n/2-way valve being used (n being an integer equal to 2 or more).

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An automatic selector device of a change-speed gearbox of a motor vehicle, comprising a selector setting element for engaging a frictional connection comprising one of a clutch and brake, a selector valve connected to the selector setting element via a working pressure conduit, an electromagnetic control valve, an electronic control unit operatively arranged to trigger the electromagnetic control valve, a control pressure conduit operatively connecting the electromagnetic control valve to the selector valve, an electromagnetic gear retention control valve operatively arranged to be triggered by the control unit and operatively connected to the working pressure conduit and arranged in the control pressure conduit so as to be operatively connected to the selector valve and to the control valve, wherein the gear retention control valve, on the occurrence of a fault signal at an output of the control unit, is configured to be driven from a gear release position in which the control pressure conduit is open and the working pressure conduit is shut off from the control pressure conduit, into a gear retention position in which the control pressure conduit is shut off and the section of the control pressure conduit connected to the selector valve is connected to the working pressure conduit.

2. The automatic selector device according to claim 1, wherein the gear retention control valve is configured to be moved by spring force into one of its gear release and gear retention positions.

3. The automatic selector device according to claim 1, wherein the gear retention control valve is a 3/2-way valve.

4. The automatic selector device according to claim 1, wherein a common gear retention control valve is provided for a number n of frictional connections each having an associated selector setting element, the gear retention control valve is a 3 n/2-way valve and n is an integer greater than one.

5. The automatic selector device according to claim 1, wherein the selector valve is a 3/2-way valve with controlled output pressure of a pressure control valve being supplied thereto.

6. The automatic selector device according to claim 1, wherein the electromagnetic control valve is a 3/2-way valve.

7. The automatic selector device according to claim 6, wherein in a zero position selected by spring force of the electromagnetic control valve connected to a main pressure conduit and to a pressure-relieved return, the control pressure conduit is shut off from the main pressure conduit and is connected to the return and, in a gear position of the control valve, the control pressure conduit is connected to the main pressure conduit and is shut off from the return.

8. The automatic selector device according to claim 1, wherein the selector valve is a pilot-controlled pressure control valve.

9. The automatic selector device according to claim 8, wherein the control valve is a pressure control valve.

10. The automatic selector device according to claim 2, wherein the gear retention position is selected by a spring force.

11. The automatic selector device according to claim 10, wherein an auxiliary pressure force is provided to support the spring force.

12. The automatic selector device according to claim 2, wherein the gear retention position is configured to be selected electromagnetically.

13. The automatic selector device according to claim 12, wherein a gear retention control stage, which is configured to be triggered by the control unit, is operatively connected to a current source independent of the control unit and to the gear retention control valve such that, on the appearance of the fault signal, the stage can be brought into a gear retention position in which the gear retention control valve is connected to the independent current source.

14. The automatic selector device according to claim 12, wherein the control valve is arranged to be switched off by a selector element configured to be triggered by the control unit with the appearance of the fault signal.

15. The automatic selector device according to claim 14, wherein the control valve is operatively connected to a switch-off delay element configured to be operationally dependent on the control unit and on the condition of a recognition element responding to the control valve such that the excitation of the control valve is maintained for a limited period of time with simultaneous appearance of the fault signal appears simultaneously.

16. The automatic selector device according to claim 15, wherein the delay element is configured to be switched off by a selector element arranged to be triggered by the control unit in the absence of the fault signal is not present.

17. The automatic selector device according to claim 15, wherein the control valve and a capacitor used as the delay element, together with the selector element used for switching off the delay element, are connected to a final stage arranged to be triggered by the control unit.

18. The automatic selector device according to claim 16, wherein the delay element is configured to be switched off by a selector element arranged to be triggered by the control unit in the absence of the fault signal is not present.

19. The automatic selector device according to claim 13, wherein a common selector relay constitutes the gear retention control stage the selector element for switching off the control valve.

20. The automatic selector device according to claim 19, wherein the control valve is arranged to be switched off by a selector element configured to be triggered by the control unit with the appearance of the fault signal.

* * * * *